United States Patent Office 3,523,944
Patented Aug. 11, 1970

3,523,944
IMINODIBENZYLS AND A PROCESS
FOR THEIR PREPARATION
Jean Cahn, Paris, France, assignor to Societe a responsabilite dite: MAR-PHA Societe d'Etude et d'Exploitation de Marques, Paris, France
No Drawing. Filed Mar. 21, 1967, Ser. No. 624,729
Claims priority, application Great Britain, Mar. 25, 1966, 13,362/66
In. Cl. C07d 41/08
U.S. Cl. 260—240         2 Claims

ABSTRACT OF THE DISCLOSURE

N - [3,4-di(alkoxycarbonyl)cinnamyl]iminodibenzyl of the formula:

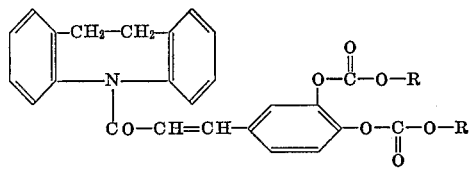

wherein R is a lower alkyl group, and a nontoxic acid addition salt of said compound. The compound which is an antidepressant is prepared by refluxing 3,4-di(alkoxycarbonyl)cinnamic acid chloride and iminodibenzyl in anhydrous benzene, separating out the residue and crystallizing the compound from the residue.

---

The present invention provides new, pharmaceutically useful N - [3,4-di(alkoxycarbonyl)cinnamyl]iminodibenzyls of the formula:

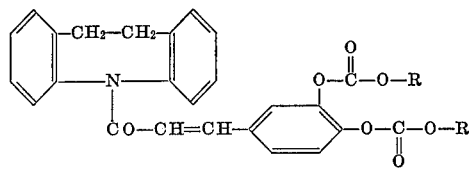

in which R represents a lower alkyl group, and their nontoxic acid addition salts.

More particularly, the present invention provides N-[3,4-di(ethoxycarbonyl)cinnamyl]iminodibenzyl of formula:

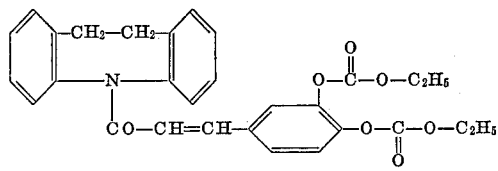

The new compounds may be prepared by a process which comprises reacting a 3,4-di[(lower alkoxy)carbonyl] cinnamic acid halide in an inert solvent with iminodibenzyl at an elevated temperature. For example, N-3,4-[di(ethoxycarbonyl)cinnamyl]iminodibenzyl may be prepared by reacting 3,4-di(ethoxycarbonyl)cinnamic acid chloride in benzene solution with iminodibenzyl, according to the following reaction:

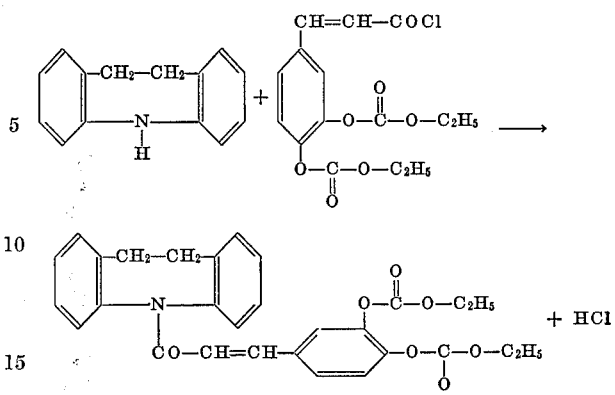

In the resulting compound, the free phenolic functions in caffeic acid are blocked with ethoxycarbonyl groups. These blocking groups are relatively easy to remove even in vivo to give the free 3,4-dihydroxycinnamyl derivative.

The invention is illustrated by the following examples:

EXAMPLE 3.4 g. (0.01 mole) of 3,4-di(ethoxycarbonyl)cinnamic acid chloride dissolved in 10 ml. of anhydrous benzene were introduced into a 50 ml. flask. 1.95 g. (0.01 mole) of iminodibenzyl were added and the mixture heated under reflux for 24 hours, after which, the solution was filtered and the benzene evaporated under reduced pressure. The residue was dissolved in hot alcohol (about 15 ml.). On cooling, the N-[3,4-di(ethoxycarbonyl)cinnamyl]iminodibenzyl which crystallised out, was filtered off. The crystals obtained were recrystallised dissolving them in the minimum amount of hot alcohol and filtering the solution. On cooling, white crystals of N-[3,4-di-ethoxycarbonyl)cinnamyl]iminodibenzyl were obtained, which, on filtering and drying in an oven at 80° C. gave 4.1 g. (82% of the theoretical yield) of white crystals melting at 153° C.; these were insoluble in water and soluble in acetone.

The therapeutic effectiveness of one of the compounds of the invention is illustrated by the following tests.

(1) Antagonistic effect relative to Reserpine in rats

The purpose of this test, which was conducted with white male rats, was to compare the effect of the compound of the invention with that of Tofranil [N-(γ-dimethylaminopropyl)-iminobenzyl], known for its antagonistic effect relative to reserpine, on the development of ptosis, the foetal attitude and the body temperature after injection of reserpine.

Twenty rats each weighing about 170 grams, divided into 5 groups, were used for this study. Two groups received Tofranil administered orally in dosages of 10 and 25 mg./kg., two other groups received the equivalent amounts of the new compound administered in the same manner, and the last group received only isotonic saline. Ninety minutes after these materials had been administered all the rats were given an intraperitoneal injection of 2.5 mg./kg. of reserpine. Checks were carried out 2, 4, 6 and 24 hours after this injection. The results are listed in the tables.

Table I shows, as a function of time, the number of animals showing ptosis, and the mean intensity of this symptom in a group. It was found that Tofranil is ineffective at a dosage of 10 mg./kg. and that at 25 mg./kg. it encourages both the appearance and the regression of the symptom. On the other hand, the new compound at a dosage of 10 mg./kg. reduced the phenomenon, and, at 25 mg./kg., there was, in addition, a very clear effect on the time of appearance and time of regression, so that the ptosis was only present in half the animals and only after 4–6 hours.

Table II (foetal attitude) leads to similar observations. The ingestion of 25 mg./kg. of the new compound practically completely prevented this change of posture, and a dosage of 10 mg./kg. is only a little less effective; the effect of Tofranil is doubtful.

Table III shows the change in body temperature as a function of time. Tofranil has an antagonistic effect on the hypothermia induced by reserpine; this effect is proportional to the dose administered. The effect of the compound of the invention at 10 mg./kg. is very marked, but at 25 mg./kg. it is practically nil on the first three occasions of examination, and the effect is only observed after 24 hours.

Finally, the diarrhoea symptoms caused by reserpine are completely absent in the group which had received 25 mg./kg. of the new compound, and limited in the case of those treated with 10 mg./kg. No clear effect was observed with Tofranil.

It follows from this test, which is specific for demonstrating the "thymoleptic" effect of Tofranil, that the compound of the invention is, in the case of rats, endowed with the same type of activity, but more intense, than that of Tofranil.

TABLE I.—DEVELOPMENT OF PTOSIS AS A FUNCTION OF TIME

| Test compound administered | 2 hours | | 4 hours | | 6 hours | | 24 hours | |
|---|---|---|---|---|---|---|---|---|
| | (1) | (2) | (1) | (2) | (1) | (2) | (1) | (2) |
| Reserpine | 1 | 2 | 1.5 | 4 | 2 | 4 | 1.5 | 3 |
| Tofranil at 10 mg./kg. | 1.5 | 2 | 2.5 | 4 | 2 | 4 | 1.5 | 3 |
| Tofranil at 25 mg./kg. | 2.2 | 3 | 2.3 | 4 | 1.5 | 4 | 1 | 2 |
| Compound according to the invention, at 10 mg./kg. | 1 | 2 | 1 | 2 | 1.5 | 3 | 1 | 2 |
| Compound according to the invention at 25 mg./kg. | 0 | 0 | 1 | 2 | 0.6 | 2 | 0 | 0 |

[1] Average intensity.
[2] Number of rats exhibiting ptosis within each group tested.

TABLE II.—NUMBER OF RATS EXHIBITING A FOETAL ATTITUDE IN EACH GROUP TESTED

| Compound administered | 2 hrs. | 4 hrs. | 6 hrs. | 24 hrs. |
|---|---|---|---|---|
| Reserpine | 2 | 4 | 4 | 4 |
| Tofranil at 10 mg./kg. | 2 | 4 | 4 | 4 |
| Tofranil at 25 mg./kg. | 3 | 4 | 3 | 4 |
| Compound according to the invention at 10 mg./kg. | 2 | 2 | 3 | 0 |
| Compound according to the invention at 25 mg./kg. | 0 | 1 | 1 | 0 |

TABLE III.—CHANGE IN TEMPERATURE IN °C. AS A FUNCTION OF TIME

| Compound administered | 2 hrs. | 4 hrs. | 6 hrs. | 24 hrs. |
|---|---|---|---|---|
| Reserpine | −0.37 | −0.40 | −0.97 | −1.10 |
| Tofranil at 10 mg./kg. | −0.50 | −0.90 | −0.77 | −0.50 |
| Tofranil at 25 mg./kg. | −0.50 | −0.27 | −0.37 | −0.20 |
| Compound according to the invention, at 10 mg./kg. | −0.10 | −0.32 | −0.55 | −0.40 |
| Compound according to the invention, at 25 mg./kg. | −0.47 | −0.57 | −0.80 | −0.60 |

(2) Effect on the motor activity of mice

The effect of the compound of the invention on the spontaneous motor activity of mice, with and without a preliminary dose of amphetamine, was compared with that of Tofranil. The following technique was used. The amphetamine was injected subcutaneously at a dosage of 2.5 mg./kg.; the Tofranil was administered orally at dosages of 10 and 25 mg./kg. or the new compound orally at a dosage of 10 mg./kg. The number of mice in each experimental series is shown in Table IV. In order to measure the motor activity the mouse was placed in a rectangular (25 cm. x 15 cm.) "Plexiglas" cage through which two crossed infrared beams pass; the beams are interrupted when the animals move, and these interruptions were recorded by a photoelectric device and a calculator; the number of interruptions during the period of time selected was taken as a measure of the motor activity. This motor activity was measured for two successive periods of 5 minutes; the mice were placed in the cage 60 minutes after ingestion of the Tofranil or of the new compound, and 20 minutes after the amphetamine had been injected. The results are shown in Table IV below.

Neither the compound of the invention nor Tofranil affected the exploratory motor activity (attributable to the searching instinct of the animal) observed between 0 and 5 minutes, on the other hand, the two compounds reduced the basic motor activity, that compound of the invention being greater than that of Tofranil, for comparable posology.

The compound of the invention, at dosages of 10 mg./kg., reduced the motor activity of the mice which had received the amphetamine. It is, above all, the effect observed between 0 and 5 minutes which allows one to conclude that a reduction in hyperactivity has been caused. At a dosage of 10 mg./kg., Tofranil was ineffective; at a dosage of 25 mg./kg., a reduction of motor activity (compared to a group which had only received the amphetamine) was only observed between 0 and 5 minutes. Thus the compound of the invention has the same type of activity as that of Tofranil but for comparable posology its effect is greater.

The compound of the invention thus has thymoleptic properties which, on the one hand, make for a preservation of the searching instinct of the mouse at a strongly reduced basic motor activity and, on the other hand, for a reduction of the hyperactivity released by the amphetamine.

TABLE IV

| Series | No. of mice | Motor activity 0–5 minutes | 5–10 minutes |
|---|---|---|---|
| Amphetamine 2.5 mg./kg. | 10 | 87 | 38 |
| Tofranil 10 mg./kg. plus amphetamine 2.5 mg./kg. | 10 | 77 | 39 |
| Tofranil 25 mg./kg. plus amphetamine 2.5 mg./kg. | 5 | 63 | 33 |
| Compound of the invention 10 mg./kg. plus amphetamine 2.5 mg./kg. | 10 | 44 | 17 |
| Tofranil 10 mg./kg. | 10 | 69 | 30 |
| Compound of the invention 10 mg./kg. | 10 | 62 | 7 |
| Controls | | 71 | 43 |

(3) Toxicity

Pharmacological experiments showed that the new compound is less toxic than Tofranil, whose DL50 for rats, when administered orally, is 625 mg./kg.

When used in human beings as a thymoleptic agent the compound according to the invention may be administered:

Either dissolved in an appropriate solvent in a dosage unit form such as injectable and drinkable ampoules, syrup;

Or in the solid state in a dosage unit form such as tablets, capsules, catches, granules, suppositories.

The dosage unit is approximately 50 mg. and the total daily dose to be administered is inferior to or equals 500 mg.

What we claim is:

1. N - [3,4 - di(alkoxycarbonyl)cinnamyl]iminodibenzyl of the formula:

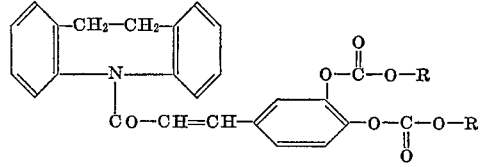

wherein R is a lower alkyl group, and a nontoxic acid addition salt of said compound.

2. N - [3,4 - di(ethoxycarbonyl)-cinnamyl]-iminodibenzyl of the formula:
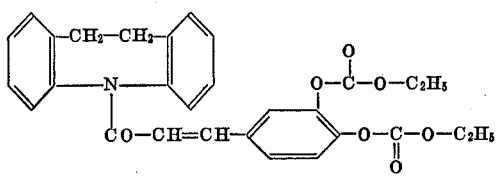
and a nontoxic acid addition salt of said compound.
References Cited
UNITED STATES PATENTS
2,666,051  1/1954  Hafliger et al. _____ 260—239
JOHN D. RANDOLPH, Primary Examiner
U.S. Cl. X.R.
424—244